(No Model.)
J. RUNKLE.
HARROW.
No. 443,115. Patented Dec. 23, 1890.
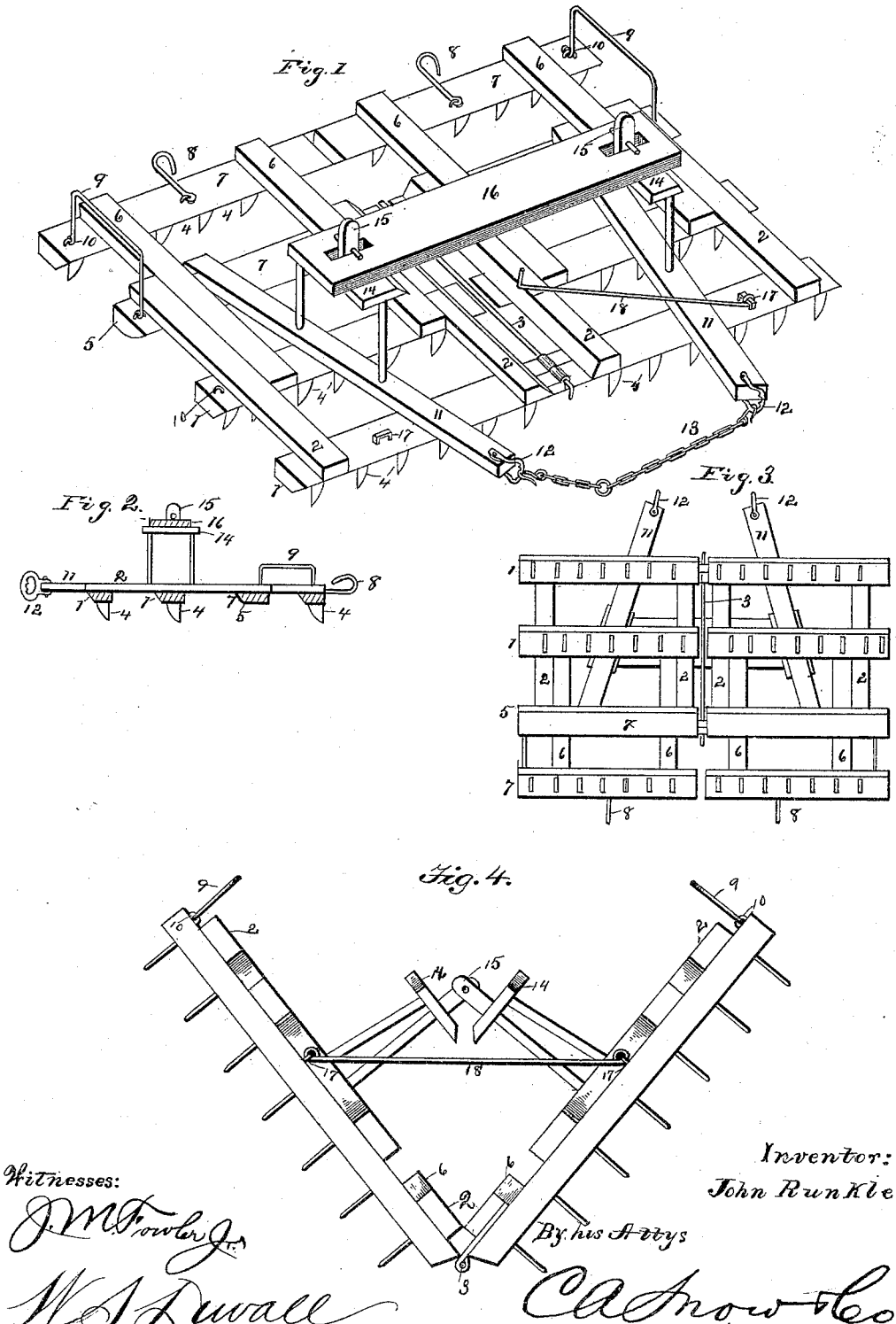
Witnesses:
J. M. Fowler Jr.
W. J. Duvall
Inventor:
John Runkle
By his Attys
C. A. Snow & Co.

UNITED STATES PATENT OFFICE.

JOHN RUNKLE, OF TIPPECANOE COUNTY, INDIANA.

HARROW.

SPECIFICATION forming part of Letters Patent No. 443,115, dated December 23, 1890.

Application filed July 15, 1890. Serial No. 358,809. (No model.)

*To all whom it may concern:*

Be it known that I, JOHN RUNKLE, a citizen of the United States, residing in the county of Tippecanoe and State of Indiana, (post-office, address Delphi, Indiana,) have invented a new and useful Harrow, of which the following is a specification.

This invention has relation to improvements in harrows of that class comprising two hinged sections, each adapted for independent movement.

The objects of the invention are to provide a combined harrow, crusher, and smoother all in a single cheap structure and efficient in use, to provide means for folding the harrow-sections when leaving or going to the field, and for supporting a driver's seat in such a manner as to throw a portion of the weight upon each of the harrow-sections and yet permit of their independent movement irrespective of the seat.

Referring to the drawings, Figure 1 is a perspective of a harrow constructed in accordance with my invention. Fig. 2 is a transverse section. Fig. 3 is a bottom plan. Fig. 4 is a perspective, the harrow being folded.

Like numerals of reference indicate like parts in all the figures of the drawings.

As before stated, the harrow comprises two harrow-sections, each of said sections consisting of, in this instance, three transverse harrow-bars 1, connected at their ends by suitable longitudinal tie-bars 2. The inner ends of the harrow-sections are hinged together in a detachable manner by means of a hinge-rod 3. The two front harrow-bars are provided with harrow teeth 4, which are secured firmly in the bars in any well-known manner, and said teeth have their front edges beveled, so as to thoroughly cut and pulverize the clods of earth with which they are brought in contact, and also to adapt the teeth to ride over and clear themselves of trash. The teeth of one bar are located in such relation with those of the rear bar as to alternate therewith, as is common. The rear harrow-bar is toothless and has its front edge curved, as at 5, or chamfered, so as to act as a crusher and smoother to follow in the wake of the harrow-teeth.

Removably bolted to the two rear harrow-bars of each frame and between each pair of tie-bars is a pair of extension-bars 6, which extend to the rear beyond the harrow-sections and are connected by supplemental harrow-bars 7, having teeth 4, similar in construction to those heretofore described. The harrow-bars 7 are provided with draft-hooks 8 for a purpose hereinafter apparent.

9 designates opposite bails, the ends of which terminate in eyes, said bails having their eyes engaging staples 10, located upon the outer ends of the rear harrow-bars and the outer ends of the bars 7. The eyes of the bails may be detached from the staples of the bars 7 and the free ends of the bails swung around and connected to staples 10, secured to the outer ends of the central harrow-bars. These bails are for lifting the harrow-sections in order to free the teeth thereof from accumulations of trash.

11 designates the draft-bars, which are connected to the harrow-bars, as shown, and have their front ends converge and provided with clevises 12 in which are located a connecting draft-chain 13. One end of the draft-chain is longer than the other, so that the draft is applied at an angle to the harrow, and consequently said harrow is drawn in a diagonal direction.

14 designates a pair of seat-standards, one of which is mounted upon each of the draft-bars 11. From the tops of the standards rise posts 15, which posts are connected by a seat-board 16, having slots near its ends which receive the posts, said posts moving in the slots at each rise and fall of either of the harrow-sections.

17 designates a pair of staples, one of which is located upon the front harrow-bar of each section. In one of the staples is loosely connected a swinging hook 18, the opposite free end of which is designed to engage the companion staple when the harrow-sections are both elevated and their free ends brought toward each other, and by such connection the close relative position of the two sections is maintained.

In ordinary use the harrow-teeth act in the usual manner upon the soil, cutting and severing the clods with which they come in contact, which clods thus operated upon by the first pair of harrow-bars are next rolled or crushed by the untoothed harrow-bar at the rear ends of the harrow-sections and again harrowed by the supplemental bars 7. The harrow may be drawn rearwardly by changing the horses to the draft-hooks 8, and is preferably moved rearwardly when the ground is not under very thorough cultivation, but for fine harrowing is drawn by the draft-bars. If it is desired to smooth the ground and in a manner pack it, the supplemental harrow-bar 7 is left off, so that the untoothed bar is the last bar of the section to have contact with the soil. In order to move the harrow to and from the field, the harrow-sections are swung together and connected by the hook 18, and may also, in addition, have the draft-chain passed around the sections.

Having thus described my invention, what I claim is—

1. The combination, with opposite hinged harrow-sections comprising transverse harrow-bars, the rear ones of which are toothless, of opposite pairs of rearwardly-projecting arms removably connected to each section and supplemental harrow-bars connecting each pair of arms and provided with draft-hooks, substantially as specified.

2. The combination, with the opposite harrow-sections and the removable supplemental harrow-bars fastened to each section, of the lifting loops or bails loosely connected at their front ends to the outer ends of the rear bars of the harrow-sections, removably connected at their rear ends to the outer ends of the supplemental bars, and adapted for connection with the outer ends of the harrow-bars located in front of or adjacent to said rear harrow-bars, substantially as specified.

In testimony that I claim the foregoing as my own I have hereto affixed my signature in presence of two witnesses.

JOHN RUNKLE.

Witnesses:
GEO. H. C. BEST,
WM. BRADSHAW.